March 8, 1960 D. K. WEAVER, JR 2,928,055

SINGLE SIDEBAND MODULATOR

Filed Dec. 17, 1956 2 Sheets-Sheet 1

INVENTOR.
DONALD K. WEAVER, JR.
BY
Lyon & Lyon
ATTORNEYS.

March 8, 1960 D. K. WEAVER, JR 2,928,055

SINGLE SIDEBAND MODULATOR

Filed Dec. 17, 1956 2 Sheets-Sheet 2

INVENTOR.
DONALD K. WEAVER, JR.
BY Lyon & Lyon
ATTORNEYS.

United States Patent Office 2,928,055

Patented Mar. 8, 1960

2,928,055

SINGLE SIDEBAND MODULATOR

Donald K. Weaver, Jr., Bozeman, Mont.

Application December 17, 1956, Serial No. 628,881

7 Claims. (Cl. 332—45)

The present invention relates to improved means and techniques for both generating and detecting a single side band signal.

The present system has the advantage over other systems of generating and/or detecting single side band signals in that no sharp cut-off band pass filters or wide band 90° phase difference networks are required.

Another very important advantage is that no undesired side band components are generated in an imperfect physical part of the system, but instead the lack of complete balance results in an inverted side band which covers the same band as the desired signal, thus providing a most important advantage particularly in those arrangements where channel conservation is the important incentive for considering the use of single side band instead of amplitude modulation.

It is, therefore, another general object of the present invention to provide an improved single side band system having the above-indicated advantages.

A specific object of the present invention is to provide improved means and techniques for generating and/or detecting single side band signals without the requirement of sharp cut-off band pass filters or wide band 90° phase difference networks.

The features of the present invention which are believed to be novel are set forth with particularity in the appended claims. This invention itself, both as to its organization and manner of operation, together with further objects and advantages thereof, may be best understood by reference to the following description taken in connection with the accompanying drawings, in which:

Figures 1, 2:
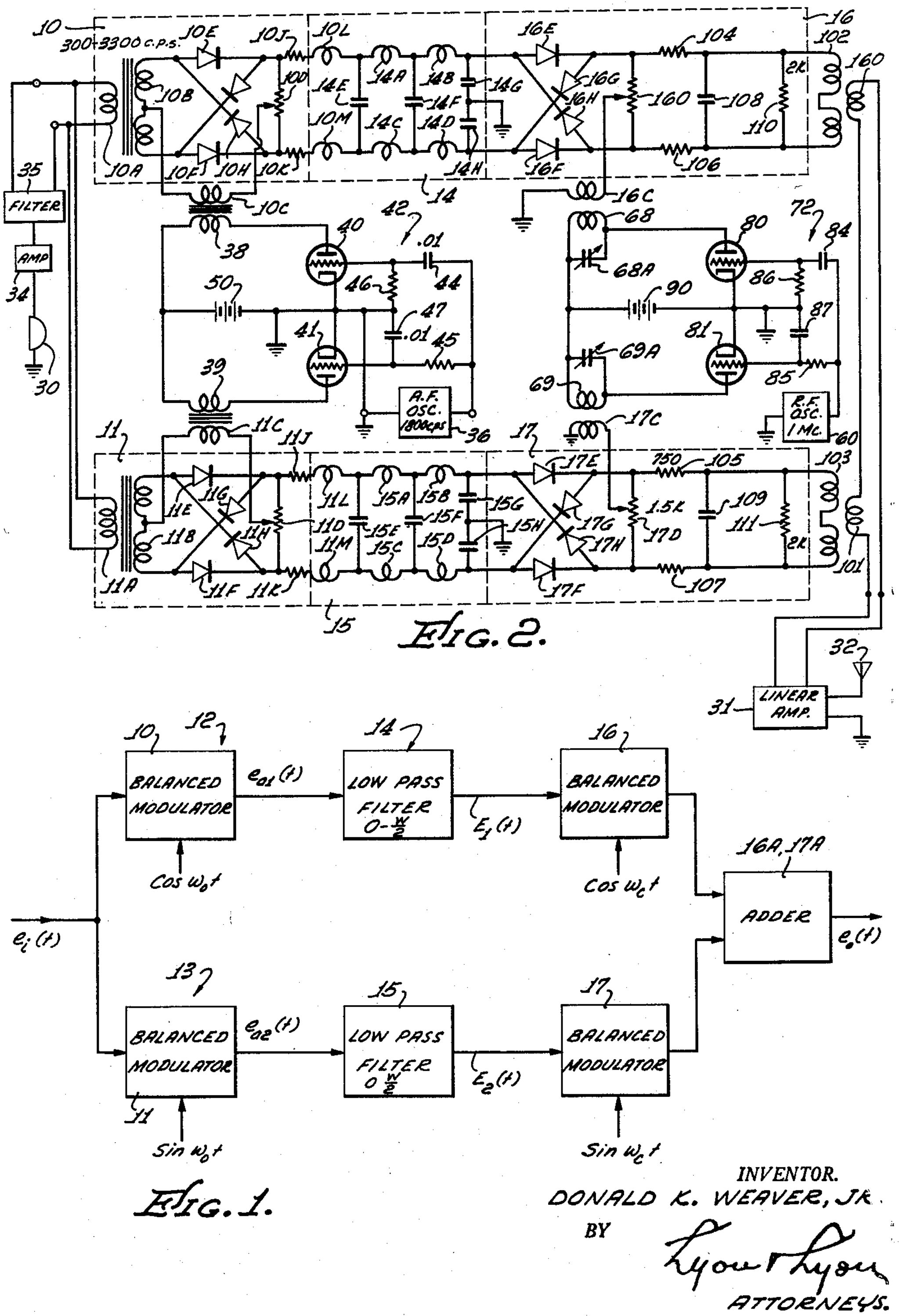
Figure 1 is a block diagram illustrating the system.
Figure 2 shows in more detail the system illustrated in Figure 1 used in generating a single side band signal.

The system incorporating the present invention is described generally in connection with Figure 1 which is sufficiently general in form to describe both the means for generating a single side band signal as well as the means for detecting a single side band signal. For purposes of simplification, Figure 1 is described first in connection with generating a single side band signal, and later explanation is devoted to the manner in which the system shown in Figure 1 is used also for single side band detection.

Thus, in the case of single side band generation, the signal represented by $e_i(t)$ may be considered to be audio signals in the range of 300 to 3300 cycles per second. This audio signal is applied simultaneously to two balanced modulator stages 10 and 11 in separate channels 12 and 13. Also applied to the modulator stages 10 and 11 for multiplication are signals represented by $\cos w_ot$ and $\sin w_ot$, respectively. The quantity $w_o$ is measured in terms of radians per second and corresponds to a frequency of 1800 cycles per second for this particular example. In general, it corresponds to the center of the signal band. The quantity $t$ represents, of course, time. The outputs of the stages 10 and 11 are represented, respectively, as $e_{a1}(t)$ and $e_{a2}(t)$. These two outputs are applied to low pass filter stages 14 and 15, respectively, having a frequency pass band extending from zero to $W/2$, where W in this specific case, mentioned for purposes of illustration, corresponds to a frequency of 3000 cycles per second. The outputs of stages 14 and 15 are represented, respectively, as $E_1(t)$ and $E_2(t)$ and applied to the corresponding balanced modulator stages 16 and 17 where multiplication occurs with corresponding quantities represented, respectively, by $\cos w_ct$ and $\sin w_ct$. In this specific case, described for purposes of illustration, the quantity $w_c$ corresponds to a frequency of 1 megacycle. In general $w_c$ is the center of the single sideband. The outputs of stages 16 and 17 are combined in the adder stage 16A, 17A so as to produce an output quantity, i.e., a single side band signal represented by the quantity $e_o(t)$.

The aforementioned audio input signal $e_i(t)$ may be developed by the use of a microphone, as represented by the microphone 30 in Figure 2; and the output signal $e_o(t)$ may be applied to a linear amplifier as represented by the linear amplifier 31 in Figure 2 for transmission by an antenna system represented by the antenna 32 in Figure 2.

The various signals mentioned above for purposes of analysis may be represented as follows:

$$e_i(t)=\sum_{n=1}^{N} E_n \cos (w_nt+\phi_n)$$

where the quantity $\phi_n$ represents the phase.

In this specific example given for purposes of demonstration, all values of $w_n$ lie between $w_o-W/2$ and $w_o+W/2$. Thus, $w_o$ corresponds to 1800 cycles per second, W corresponds to 3000 cycles per second and $w_n$ corresponds to a frequency range extending from 300 to 3300 cycles per second.

The quantities $E_1(t)$ and $E_2(t)$ obtained through multiplication and prior to filtering are represented as follows:

$$E_1(t)=2LF(e_i(t) \cos w_ot)=\sum_{n=1}^{N} E_n \cos ((w_n-w_o)t+\phi_n)$$

$$E_2(t)=2LF(e_i(t) \sin w_ot)=\sum_{n=1}^{N} E_n \sin ((w_n-w_o)t+\phi_n)$$

The output signal is represented by:

$$e_o(t)=E_1(t) \cos w_ct+E_2(t) \sin w_ct$$

which results in $$e_o(t)=\sum_{n=1}^{N} E_n \cos ((w_c+w_n-w_o)t+\phi_n)$$

It is observed that the last equation is the equation for a single side band signal corresponding to the original signal $e_i(t)$. The frequency $w_c$ is the band center and the normal carrier position corresponds to $w_c-w_o$.

A practical arrangement of the system illustrated in Figure 1 for side band generation is shown in Figure 2.

In Figure 2 the output of the sound transducer such as microphone 30 is first amplified in amplifier stage 34 and then filtered by filter stage 35 so that a signal in the range of 300 to 3300 cycles per second is applied simultaneously to the primary windings 10A, 11A of the corresponding modulator stages 10 and 11. Each of these modulator stages 10 and 11 are of identical configuration and involve center-tapped secondary windings 10B, 11B, each having their center tap connected through secondary windings 10C, 11C to an adjustable tap on corresponding resistances 10D, 11D. The outside terminals of windings 10B, 11B and resistances 10D, 11D are connected together through diodes which are poled as indicated. Thus, in the case of modulator 10, these aforementioned outside terminals are connected together by diodes 10E and 10F and also by diodes 10G and 10H forming a conventional ring or balanced modulator. Likewise, in the case of modulator 11, diodes 11E, 11F, 11G and 11H are provided for the same purpose. It is noted that the diodes 10E and 10G are serially connected and also the diodes 10F and 10H are serially connected for passage of current in the same direction.

These secondary windings 10C and 11C introduce, respectively, a co-sine and a sine term of an audio frequency signal developed in the audio frequency oscillator 36, through corresponding primary windings 38 and 39.

The oscillator 36 has its grounded terminal connected to the interconnected cathodes of the amplifier tubes 40 and 41. The other terminal of oscillator 36 is connected through a phase shifting network 42 to the control grids of these tubes 40 and 41. More specifically, the ungrounded terminal of oscillator 36 is connected to the control grids of tubes 40 and 41 through condenser 44 and resistance 45, respectively; and, these two control grids are interconnected by resistance 46 and condenser 47 which have their junction point grounded. A source of voltage 50 has one of its terminals grounded and the other one of its terminals connected to corresponding anodes of tubes 40 and 41 through primary windings 38 and 39, respectively. The signals thus developed through multiplication or modulation across the resistances 10D and 11D, respectively, are applied to the low pass filters 14 and 15 through connections which involve a resistance serially connected with a coil serving as isolation between the balanced modulation and the low pass filter. More specifically, these connections involve resistances 10J, 10K, 11J and 11K.

The low pass filters 14 and 15 are conventional and include series connected coils 10L, 10M, 11L, 11M, 14A, 14B, 14C, 14D, 15A, 15B, 15C and 15D, as well as shunt connected condensers 14E, 14F, 14G, 14H, 15E, 15F, 15G and 15H. It is noted that the junction point of condensers 14G, 14H, as well as the junction point of condensers 15G, 15H, are grounded to preserve a balanced condition with respect to ground. The second or radio frequency modulator stages 16, 17 are of identical configuration as the previously described modulator stages 12 and 13.

Thus, in like manner, modulator stage 16 includes serially connected diodes 16E, 16G and serially connected diodes 16F and 16H, as well as the tapped output resistance 16D and secondary winding 16C. Similarly, the modulator stage 17 includes the serially connected diodes 17E, 17G, the serially connected diodes 17F, 17H, the tapped output resistance 17D and the secondary winding 17C.

These secondary windings 16C and 17C serve to introduce into the corresponding modulators 16 and 17 a co-sine and a sine term of a radio frequency signal developed in the oscillator stage 60 through primary windings 68 and 69, respectively, which are tuned to the radio frequency signal by corresponding condensers 68A and 69A.

The radio frequency oscillator 60 has one of its terminals grounded and the other one of its terminals connected through a phase splitting network 72 to control grids of corresponding amplifier tubes 80 and 81. More specifically, the ungrounded terminal of oscillator 60 is connected to the control grid of tube 80 through condenser 84 and to the control grid of tube 81 through resistance 85. These control grids are interconnected by the serially connected resistance 86 and condenser 87 which have their junction point connected to the grounded cathodes of tubes 80 and 81. A voltage source 90 has one of its terminals grounded and has its positive terminal connected to the anodes of tubes 80 and 81 through corresponding tuned coils 68 and 69.

The signals developed by multiplication or modulation across the resistances 16D and 17D are combined by serially connecting the secondary windings 100 and 101, having associated primary windings 102 and 103. The winding 102 is connected to the outside terminals of resistance 16D through resistances 104 and 106, and such winding 102 is shunted by both a condenser 108 and a resistance 110. Likewise, the primary winding 103 is connected to the outside terminals of resistance 17D through resistances 105 and 107, and such winding 103 is shunted by both a condenser 109 and a resistance 111. The signals thus combined or added by windings 100 and 101 are applied to the linear amplifier 31, having its output terminal connected to transmitting antenna 32.

With reference to Figure 2, the following are representative values for the designated components: The diodes are crystal diodes of the 1 N 100 type. The resistances 10D and 11D each have a value of 750 ohms. The resistances 10J, 10K, 11J and 11K each have a resistance of 375 ohms. The coils 10L, 10M, 11L and 11M have a value of 27.5 millihenries. The coils 14A, 14C, 15A and 15C each have a value of 100 millihenries. The coils 14B, 14D, 15B and 15D each have a value of 75 millihenries. The condensers 14E and 15E each have a value of 0.15 microfarad. The condensers 14F and 15F each have a value of 0.20 microfarad. The condensers 14G, 14H, 15G and 15H each have a value of 0.11 microfarad. The resistances 16D and 17D each have a value of 1500 ohms. The resistances 104, 106, 105 and 107 each have a value of 750 ohms. The condensers 108 and 109 each have a value of 3000 micro-microfarads. The resistances 110 and 111 each have a value of 2000 ohms. The coils 102 and 103 each have a value of 8.5 microhenries. The resistances 45 and 46 may each have a value of 10,000 ohms. The condensers 44 and 47 each have a value of .01 microfarad. The resistances 85 and 86 each have a value of 160 ohms. The condensers 84 and 87 each have a value of 1000 micro-microfarads.

The single side band signal thus developed and transmitted using the arrangement specifically shown in Figure 2 may be received and detected by coventional radio receivers which have provisions for receiving and detecting single side band signals.

It is noted that each one of the balanced modulators 10, 11, 16 and 17 is a double balanced modulator and sometimes referred to in the art as a ring modulator. Such modulator, of course, includes nonlinear elements so that when two signals are applied thereto, sum and difference frequencies are developed, but the ring modulator functions so that the two signals applied thereto are balanced with respect to the output. This means that the output of each balanced modulator comprises both or double side bands of the signals combined in the modulator. In order to assure balanced operation, adjustable taps are provided on the various resistances 10D, 11D, 16D and 17D. Thus, each of the balanced modulators may be referred to as a signal multiplying and suppressing means sensitive to signals applied thereto for developing only side band components thereof. The output of each of the balanced modulators thus comprises a double side band signal. The function of the filter or frequency selective means 14 and 15 is generally that of selecting one of the double side bands so that a single side band signal is applied as an input to the balanced modulator stages 16 and 17. However, in this system the lower side band which is selected by low pass filters 14 and 15 is "folded" about zero frequency and hence has only one-half the bandwidth of a conventional side band. Double side band signals result from the application of the two signals $E_1(t)$ and $E_2(t)$ to balanced modulators 16, 17 and such signals have the same bandwidth, W, as the original signal $e_i$(T). By combining the signals at the output of stages 16 the resulting signal $e_o$(T) also has a bandwidth W. However, the various spectrum components either add or cancel so that a single side band signal appears at the output of the other stage 16A, 17A.

Summarizing, the input signal $e(t)$ has its energy confined to a band width W radians per second, centered about frequency $w_o$ radians per second. The two ring modulators 10 and 11 operate on the signal producing two functions of time, $E_1(t)$ and $E_2(t)$, each having its energy confined to the frequency band zero to $W/2$ radians per second. The two frequency selective networks or low pass filters 14 and 15 pass all frequencies equally and with a constant time delay from zero to $W/2$ radians per second. These filters 14, 15 provide adequate suppression of the higher frequency components from the balanced modulators. The lowest frequency of these unwanted products occurs at $2w_o-W/2$ radians per second which provides a transition region from $W/2$ to $2w_o-W/2$. These two filters 14 and 15 should have identical response characteristics in the pass band. The two signals $E_1(t)$ and $E_2(t)$ are applied to another pair of balanced modulators 16 and 17. In this latter instance, the translating frequency $w_c$ is the band center of the single side band signal. The location of the normal carrier is at $w_c-w_o$ radians per second. The output from these two balanced modulators 16, 17 are added together, forming the single side band signals. Any high frequency components centered about multiples of $w_c$ are eliminated by passing the same through a frequency selective network or filter. By interchanging $e_i(t)$ with $e_o(t)$ and $w_o$ with $w_c$, the block diagram of Figure 1 becomes the block diagram for a single side band demodulator.

Figure 3:
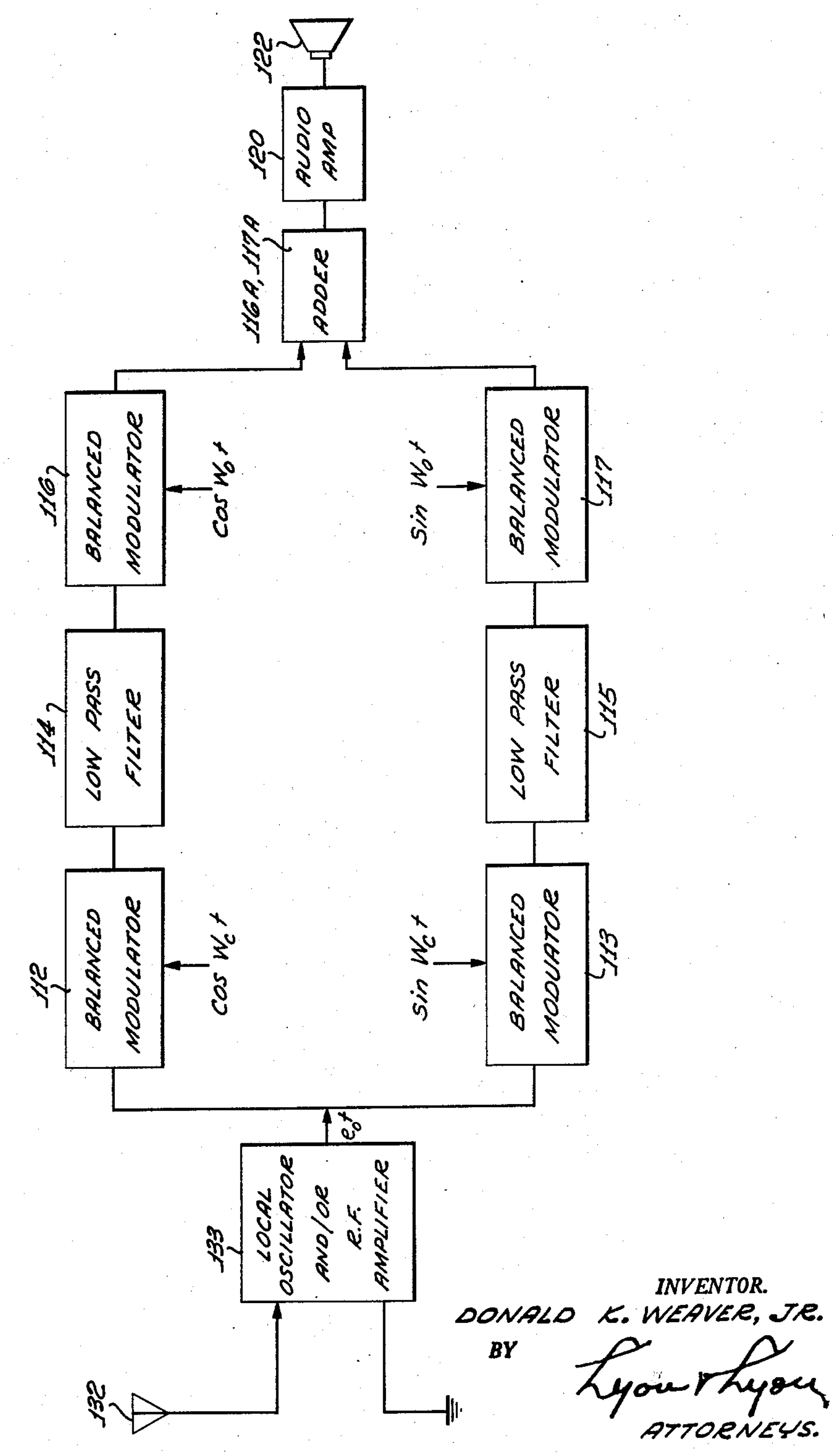
Figure 3 illustrates apparatus embodying features of the present invention for detecting a single side band signal.

Indeed, in accordance with another aspect of the present invention, the receiving system incorporates a detection system illustrated generally in Figure 1, as modified above, and illustrated more specifically in Figure 3. This transformation indicated above in connection with Figure 1 is illustrated in the block diagram of the receiver in Figure 3. The signal $e_o(t)$ at the receiver may be directly received on the antenna 132 and amplified before being applied to the balanced modulator stages 112, 113; or such signal represented by $e_o(t)$ may be produced by conventional superheterodyne action using a local oscillator, as indicated in the stage 133. The signal $e_o(t)$ is combined with quadrature components of the signal having a frequency of 1 megacycle and corresponding to $w_c$. The output of each of the modulator stages 112 and 113 is a double side band signal, and the lower side band of each of the signals is selected by the corresponding frequency selective or filter network 114, 115, so that a single side band signal is applied to the balanced modulator stages 116, 117, to which is also applied quadrature components of the signal having a frequency of 1800 cycles per second corresponding to $w_o$. The output of the modulator stages 116, 117 is combined in the adder stage 116A, 117A, and the output of the last-mentioned stage is amplified in the audio amplifier 120 before being applied to the speaker 122.

I claim:

1. In a system of the character described, a first signal comprising a band of audio frequencies, a second signal of audio frequency within said band, a third signal of radio frequency, individual means multiplying said first signal with individual quadrature components of said second signal to derive individual side band signals corresponding respectively to each one of said components, individual frequency selective means for selecting a portion of each of said side band signals, individual means multiplying a corresponding one of said portions with a corresponding quadrature component of said third signal, and means combining the outputs of each of the last-mentioned individual means.

2. In a system of the character described, a signal comprising a band of audio frequencies, a pair of substantially identical channels fed by said signal, each one of said channels comprising, in cascade, a first balanced modulator, frequency selective means and a second balanced modulator, said signal being applied to the first modulator in each channel, a second audio signal having individual quadrature components applied to the first modulator in corresponding channels, said second audio signal having a frequency in said band of audio frequencies, a second signal having individual quadrature components applied to the second modulator in corresponding channels, and means combining the output of the second modulator in one of said channels with the output of the second modulator in the other one of said channels.

3. In a system of the character described, a source of a first signal voltage having a frequency band, a source of a second signal voltage having a frequency within said band, a source of a third signal voltage, balanced modulator means coupled to said first and second sources and functioning to produce first side band signals in accordance with, on the one hand, said first signal and a quadrature component of said second signal, and, on the other hand, second side band signals in accordance with said first signal and a second quadrature component of said second signal, frequency selective means for filtering said first and second side band signals, second balanced modulator means coupled to said third source and receiving said filtered side band signals and functioning to produce third side band signals in accordance with one of said filtered side band signals and a quadrature component of said third signal and functioning to produce fourth side band signals in accordance with the other filtered side band signals and a second quadrature component of said third signal, and means combining said third and fourth side band signals.

4. In a system of the character described, a first signal having a band of frequencies, a second signal having a frequency within said band, means deriving quadrature components of said second signal, individual signal multiplying and suppressing means sensitive to said first signal and a corresponding one of said quadrature components and functioning to develop first and second side band signals, first and second frequency selective means for filtering respectively said first and second side band signals, a third signal, second individual multiplying and suppressing means sensitive to corresponding filtered side band signals and respectively corresponding quadrature components of said third signal, and means combining the output of said second signal multiplying and suppressing means.

5. In a system of the character described for producing a single side band suppression carrier signal, the combination comprising a first signal comprising a band of audio frequencies, a second signal comprising two quadrature components and having a frequency within said band, a third signal comprising two quadrature components, first individual balanced modulating means sensitive to said first signal and corresponding quadrature components of said second signal and functioning to develop first and second side band signals, second individual balanced modulating means sensitive respectively to said first and second side band signals and corresponding quadrature components of said third signal and functioning to develop third and fourth side band signals, and means combining said third and fourth side band signals to produce a single side band signal.

6. In a method of the character described, the steps comprising multiplying a first band of signals with quadrature components of a second signal within said band to develop first and second side band signals, filtering said first and second side band signals to produce third and fourth signals which are each only the lower side bands of said first and second signals, multiplying said third and fourth signals respectively with quadrature components of a fifth signal to develop third and fourth side band signals, and combining said third and fourth side band signals.

7. In a system of the character described, a pair of substantially identical channels connected in parallel, a first source of signals in a band of frequencies fed into one end of each of said channels in substantially the same phase, each of said channels comprising in cascade first balanced modulating means, low pass filtering means, and second balanced modulating means, an adding network receiving the output of the second balanced modulating means in each channel, a second source of signals having quadrature components thereof supplied to the first balanced modulating means in corresponding ones of said pair of channels, said first and second source of signals having a comparable frequency of the same value within said band of frequencies, said low pass filter in each channel passing only the lower side band of signals in corresponding channels.

References Cited in the file of this patent

UNITED STATES PATENTS

| | | |
|---|---|---|
| 1,719,052 | Green | July 2, 1929 |
| 1,964,522 | Lewis | June 26, 1934 |
| 2,018,356 | Hammond | Oct. 22, 1935 |
| 2,173,145 | Wirkler | Sept. 19, 1939 |